United States Patent Office.

A. MEYER-BERCK, OF FRANKFORT-ON-THE-MAINE, PRUSSIA, ASSIGNOR TO ALFRED MELLOR AND H. N. RITTENHOUSE, OF PHILADELPHIA, PENNSYLVANIA.

Letters Patent No. 81,190, dated August 18, 1868.

IMPROVED ARTICLE OF FOOD FOR THE SICK.

The Schedule referred to in these Letters Patent and making part of the same.

TO ALL WHOM IT MAY CONCERN:

Be it known that I, A. MEYER-BERCK, of Frankfort-on-the-Maine, in the Kingdom of Prussia, have invented a new and useful Article of Food for the Sick and Delicate; and I do hereby declare that the following is a full, clear, and exact description of the same, and of the process of preparing it.

It is now a well-established scientific doctrine that the human body requires two kinds of food, commonly termed respiratory and plastic. The respiratory mainly supplies the heat necessary for the performance of the vital functions, while the plastic food is the regenerator of blood and flesh, and affords the materials by which chemical power can be at once converted into motion, without the intervention of caloric, as an intermediate agent. The respiratory kinds of food can generally be taken in an easily-digestible form; but it is not so with the plastic forms of food, particularly meat, which, as ordinarily prepared by culinary art, is not rarely quite unsuited for the assimilation of the delicate stomach.

This circumstance attracted the attention of Liebig, who was the first to suggest a cold extract of meat as a remedial agent in certain low conditions of the system, consequent upon fevers or other ailments of the intestinal canal; but as this extract had always to be prepared for immediate consumption, and could not be preserved, it was precluded from general application, however excellent in theory and effect. This was much regretted by all men of science, particularly as a number of spurious extracts of meat, prepared from roasted, baked, or boiled beef, and mixed with much gelatine, were offered for sale, and largely bought by uninformed people.

There also arose, in the minds of many persons, confusion, through the circumstance that Liebig had introduced the use of another kind of extract of meat, which was prepared by the agency of heat, and represented, in fact, condensed beef-tea, free from gelatine and fat, a preparation for which the nutritive value of the raw broth, or that of meat itself, could never be and never has been claimed.

All these preparations left, however, one great desideratum to be supplied, namely, a preparation which should include, in a palatable, digestible, and easily-preservable form, all the soluble nutritive ingredients of beef, namely, the albumen, the red-coloring matter, and the immediate principles, besides the salts of phosphoric acid and potash.

This problem has been solved by my invention of what I have named "Sirup of Extract of Beef."

The nature of my invention consists, substantially as hereinafter described, in the use of the serum of beeves' blood as the basis of a nutritive sirup for the sick and delicate.

To enable others to understand, make, and use my said invention, I will proceed to describe the manner of producing and using the same.

I take the blood of a freshly-killed, healthy beef, and allow it to stand in an open vessel about two hours, or until the coagulum separates from the serum, and then I throw the whole upon a filter, and allow the serum to filter through. I now take the filtered serum and add, for every pint of the same, about two pounds, (more or less,) of crushed white sugar, and convert the whole into a sirup, in the usual manner of producing other sirups, and, finally, bottle it for transportation and use when required.

All testimonials relating to this sirup agree in stating that it is tolerated and digested by the most sensitive stomachs; that children affected with atrophy and scrofula, and such as have weak digestions by being brought up by hand, will be improved thereby; and in the feebleness succeeding upon acute fevers, such as scarletina and measles, or in diarrhœa, dysentery, cholerine, catarrh of the stomach, or in chronic sea-sickness, dyspepsia, tuberculosis, anœmia, and scorbutic conditions, after-losses of blood in child-beds, &c., this sirup of the extract of beef is invaluable.

The sirup should be administered to patients by itself, but where that is objectionable, it may be given in milk, tea, or chocolate, wine, or with any medicine prescribed by the medical attendant. Broth or beef-tea is not a very suitable vehicle, as the taste does not agree well with the sweet flavor of the sirup The dose, for little children, half a teaspoonful; for young people up to fifteen years of age, one teaspoonful; and for adults, about two teaspoonfuls; in all cases repeated three or four times a day.

In cases when the administration by the mouth is not practicable, it may be given as an enema, with a little warm water; in all cases repeated several times during the day.

Having thus fully described my invention, what I claim as new, and desire to secure by Letters Patent, is—

The employment or use of the serum of beeves' blood, as a constituent in the production of a nutritive sirup for the sick and delicate, substantially as described.

A. MEYER-BERCK.

Witnesses:
ALEXANDER SCHEIDLER,
MORITZ LÖHNER.